(12) United States Patent
Yoo

(10) Patent No.: US 8,259,253 B2
(45) Date of Patent: Sep. 4, 2012

(54) BACKLIGHT UNIT AND DISPLAY APPARATUS

(75) Inventor: Jun-mo Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 12/820,582

(22) Filed: Jun. 22, 2010

(65) Prior Publication Data

US 2011/0102707 A1 May 5, 2011

(30) Foreign Application Priority Data

Nov. 2, 2009 (KR) .......................... 10-2009-0105024

(51) Int. Cl.
*G02F 1/1335* (2006.01)

(52) U.S. Cl. ................ 349/62; 349/64; 349/65; 349/66; 349/67

(58) Field of Classification Search ............... 349/62–67
See application file for complete search history.

*Primary Examiner* — Phu Vu
(74) *Attorney, Agent, or Firm* — Sughrue Mion, PLLC

(57) ABSTRACT

A backlight unit and a display apparatus are provided, the display apparatus including: a display panel on which an image is displayed; and a backlight unit which provides backlight to the display panel, the backlight unit including a plurality of light guide plates, a plurality of substrates which are respectively disposed on at least two surfaces of the corresponding plurality of light guide plates, and a plurality of light emitting units which are respectively disposed between the plurality of light guide plates, and respectively disposed on a surface of the corresponding plurality of substrates. Therefore, a heat radiating surface of a backlight unit is broadened, thereby improving a heat radiating effect and causing the backlight unit to be assembled easily.

22 Claims, 4 Drawing Sheets

BACKLIGHT UNIT AND DISPLAY APPARATUS

CROSS-REFERENCE TO RELATED APPLICATION

This application claims priority from Korean Patent Application No. 10-2009-0105024, filed on Nov. 2, 2009 in the Korean Intellectual Property Office, the disclosure of which is incorporated herein by reference in its entirety.

BACKGROUND

1. Field

Apparatuses and methods consistent with exemplary embodiments relate to a backlight unit and a display apparatus, and more particularly, to a backlight unit which displays an image using backlight radiated from a light emitting module in a display and a display apparatus having the same.

2. Description of the Related Art

A liquid crystal display (LCD) which is widely used cannot emit light for itself. Therefore, an LCD panel needs to have a backlight unit which provides backlight to the LCD.

The backlight unit includes a light emitting unit which generates the backlight and a light guide plate which uniformly transmits the backlight radiated from the light emitting unit onto a panel surface of the LCD. The light emitting unit includes light emitting elements which are disposed in order to efficiently provide the backlight to the LCD and a driving element which drives the light emitting elements. A proper number of driving elements is provided to drive the light emitting elements without any problems. The backlight unit has been classified into a direct-type and an edge type according to a position of the light emitting elements of the backlight unit. In the direct-type, the light emitting elements are evenly disposed on the entire backlight unit, and in the edge type, the light emitting elements are disposed only around a periphery of the backlight unit.

Recently, however, the backlight unit in the type of a partitioned light guide plate (or, a tandem type) has been developed. In the type of the partitioned light guide pate, plural light guide plates provide light to an LCD panel. The backlight unit which is manufactured in the type of the partitioned light guide plate may employ local dimming which is supported in the direct-type of backlight unit and may also be manufactured as an ultra thin device, such as the edge type of backlight unit.

However, there is a need for methods to enhance a heat radiating effect of the backlight unit used in the type of the partitioned light guide plate and to improve the performance of assembling of the backlight unit.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

The exemplary embodiments provide a backlight unit including a printed circuit board (PCB) disposed on two surfaces of a light guide plate and a light emitting element disposed on a surface of the PCB, and a display apparatus having the same.

According to an aspect of an exemplary embodiment, there is provided a display apparatus, including: a display panel on which an image is displayed; and a backlight unit which provides backlight to the display panel, wherein the backlight unit includes: a plurality of light guide plates; a plurality of substrates which are respectively disposed on at least two surfaces of the corresponding plurality of light guide plates; and a plurality of light emitting units which emit the backlight, are respectively disposed between the plurality of light guide plates, and respectively disposed on a surface of the corresponding plurality of substrates.

The plurality of substrates may be respectively disposed on a bottom surface and a side surface of the corresponding plurality of light guide plates.

The side surface of each of the plurality of light guide plates may be a surface adjacent to a neighboring light guide plate.

The plurality of substrates may be bent vertically to respectively contact two surfaces of the corresponding plurality of light guide plates.

The plurality of substrates may respectively include a reflection surface which reflects light leaking out from the corresponding plurality of light guide plates.

The plurality of substrates may be flexible circuit boards.

The backlight unit may further include: a bottom chassis; and a plurality of fixing units which respectively fix the plurality of light guide plates and the corresponding plurality of substrates to the bottom chassis.

A heat radiating effect of the plurality of light emitting units may be proportional to a contacting surface between the respective bottom surface of the plurality of light guide plates and the corresponding plurality of substrates.

The backlight unit may be configured as a partitioned light guide plate.

According to an aspect of another exemplary embodiment, there is provided a backlight unit, including: a plurality of light guide plates; a plurality of substrates which are respectively disposed on at least two surfaces of the corresponding plurality of light guide plates; and a plurality of light emitting units which are respectively disposed between the plurality of light guide plates, and respectively disposed on a surface of the corresponding plurality of substrates.

The plurality of substrates may be respectively disposed on a bottom surface and a side surface of the corresponding plurality of light guide plates.

The side surface of each of the plurality of light guide plates may be a surface adjacent to a neighboring light guide plate.

The plurality of substrates may be bent vertically to respectively contact two surfaces of the corresponding plurality of light guide plates.

The plurality of substrates may respectively include a reflection surface which reflects light leaking out from the corresponding plurality of light guide plates.

The plurality of substrates may be flexible circuit boards.

The backlight unit may further include: a bottom chassis; and a plurality of fixing units which respectively fix the plurality of light guide plates and the corresponding plurality of substrates to the bottom chassis.

A heat radiating effect of the plurality of light emitting units may be proportional to a contacting surface between the respective bottom surface of the plurality of light guide plates and the corresponding plurality of substrates.

The backlight unit may be configured as a partitioned light guide plate.

According to an aspect of another exemplary embodiment, there is provided a backlight unit for a display panel, the backlight unit including: a first light guide plate and a second light guide plate, adjacent to the first light guide plate, to distribute backlight to the display panel; and a substrate disposed on at least two surfaces of the first light guide plate and comprising a surface on for mounting a light emitting unit to emit light to the second light guide plate.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
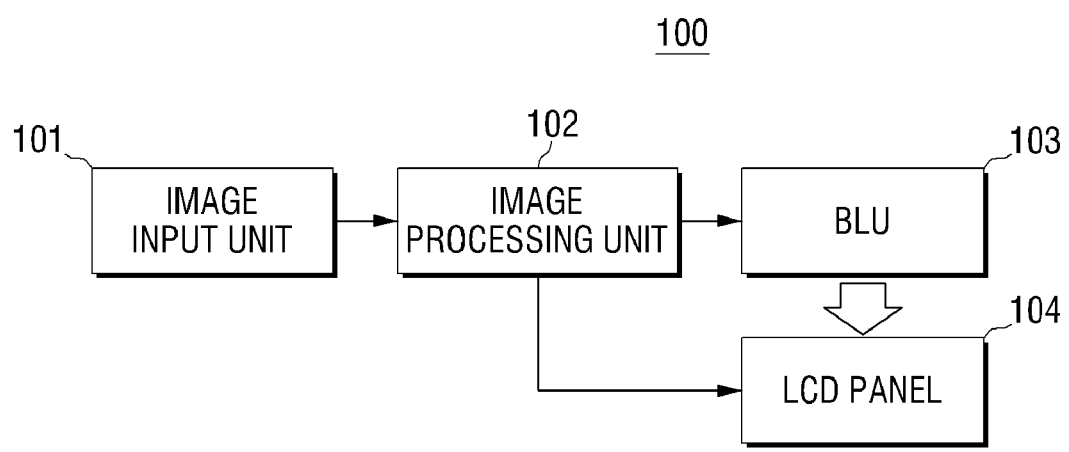
FIG. 1 is a block diagram illustrating a liquid crystal display (LCD) apparatus according to an exemplary embodiment.

Certain exemplary embodiments will now be described in greater detail with reference to the accompanying drawings. In the following description, the same drawing reference numerals are used for the same elements even in different drawings. The matters defined in the description, such as detailed construction and elements, are provided to assist in a comprehensive understanding of the exemplary embodiments. Thus, it is apparent that an exemplary embodiment can be carried out without those specifically defined matters. Also, well-known functions or constructions are not described in detail since they would obscure the exemplary embodiments with unnecessary detail.

FIG. 1 is a block diagram illustrating a liquid crystal display (LCD) apparatus 100 according to an exemplary embodiment. Referring to FIG. 1, the LCD apparatus 100 includes an image input unit 101, an image processing unit 102, a backlight unit (BLU) 103, and an LCD panel 104.

The image input unit 101 includes an interface to be connected to an external device or an external system via a wireless and/or wired connection, and receives an image from the external device or the external system. The image input unit 101 transmits the input image to the image processing unit 102.

The image processing unit 102 generates an image signal which is converted into a proper format for the LCD panel 104 and a brightness controlling signal which enables local dimming of the backlight unit 103. The image processing unit 102 generates a signal which allows a light emitting unit (not shown) of the backlight unit 103 to operate, and then transmits the signal to the backlight unit 103.

Figure 2:
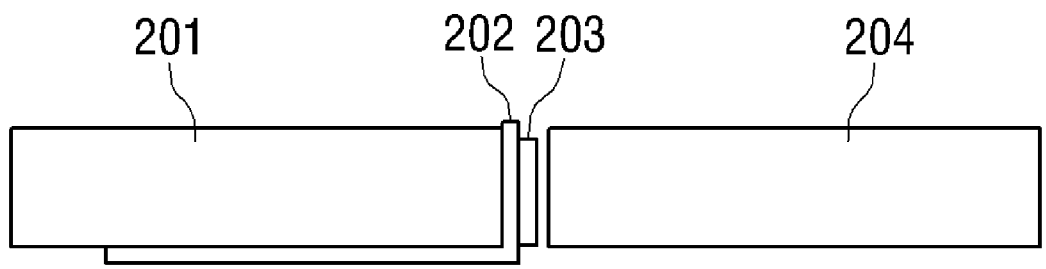
FIG. 2 is a view illustrating a part of a backlight unit according to an exemplary embodiment.

The backlight unit 103 receives the signal generated by the image processing unit 102, drives a light emitting unit 203 (illustrated in FIG. 2), and emits backlight to the LCD panel 104, since the LCD panel 104 cannot emit light for itself. The backlight unit 103 includes the light emitting unit 203 and a light guide plate 201, 204 (as illustrated in FIG. 2). The light emitting unit 203 includes a light emitting element which radiates backlight and a driving element which drives the light emitting element. The light guide plate 204 uniformly transmits the backlight radiated by the light emitting unit 203 on a panel surface of the LCD panel 104.

In more detail, the backlight radiated by the light emitting unit 203 enters the light guide plate 204. The backlight entered to the light guide plate 204 passes through a pattern, a reflection sheet, and a prism sheet of the light guide plate 204 and, thus, the luminance and luminance uniformity of the backlight are improved. The backlight passing through the light guide plate 204 is transferred to the LCD panel 104.

The LCD panel 104 adjusts transmittance of the backlight produced by the backlight unit 103 to visualize an image signal, and displays an image on a screen. The LCD panel 104 is configured in such a manner that two substrates on which electrodes are formed are disposed to face each other, and a liquid crystal material is injected between the two substrates. If voltage is applied to the two electrodes, an electric field is formed on the substrates causing molecules of the liquid crystal material injected between the two substrates to move, thereby adjusting the transmittance of the backlight.

Hereinbelow, the structure of a backlight unit 103 according to an exemplary embodiment will be explained in detail with reference to FIG. 2. FIG. 2 is a view schematically illustrating a part of the backlight unit 103 according to an exemplary embodiment.

Referring to FIG. 2, the backlight unit 103 includes a plurality of light guide plates 201, 204, a printed circuit board (PCB) 202, and a light emitting unit 203.

The light guide plates 201, 204 uniformly transmit the backlight radiated from the light emitting unit 203 to the panel surface of the LCD panel 104, as described above. The plurality of light guide plates 201, 204 are disposed at a predetermined interval.

The PCB 202 is bent and thus disposed on at least two surfaces of the light guide plate 201. Specifically, the two surfaces include a bottom surface of the light guide plate 201 and one of side surfaces adjacent to the neighboring light guide plate 204. Herein, one of the side surfaces adjacent to the neighboring light guide plate 204 is in the same direction for each light guide plate. For example, if the PCB 202 is disposed beside a right portion of the light guide plate 201, the other light guide plate 204 has a PCB (not shown) on a right portion as shown in FIG. 2.

As described above, the PCB 202 is bent to contact the bottom surface of the light guide plate 201 and one of side surfaces adjacent to the neighboring light guide plate 204. The PCB 202 may be made of a flexible material to be bent or to be thin.

The surface of the PCB 202 disposed on the bottom surface of the light guide plate 201 may be equal to or larger than half the bottom surface of the light plate 201. If the surface of the PCB 202 under the bottom surface of the light guide plate 201 is equal to or larger than half the bottom surface of the light guide plate 201, the light guide plate 201 is not bent and thus the PCB 202 is fixed on the bottom surface of the light guide plate 201 more firmly. Accordingly, a contacting surface between the PCB 202 and the bottom surface of the light guide plate 201 is broadened, thereby improving a heat radiating effect.

Moreover, the larger the contacting surface between the PCB 202 and the bottom surface of the light guide plate 201 is, the larger a heat radiating surface is and the easier the light guide plate 201 is fixed. Therefore, broadening the contacting surface between the PCB 202 and the bottom surface of the light guide plate 201 helps to enhance a heat radiating effect of the backlight unit 103 and to improve the performance of assembling of the backlight unit 103.

The PCB 202 may include a reflection surface to prevent backlight from leaking out from the light guide plate 201. The light guide plate 201 may include an additional reflection sheet to prevent backlight from leaking out. However, if the contacting surface between the PCB 202 and the light guide plate 201 is configured as a reflection surface without having the additional reflection sheet, the backlight leaking out from the light guide plate 201 may be reflected by the reflection surface of the PCB 202. Therefore, the reflection surface of the PCB 202 improves luminance of the backlight despite not having the additional reflection sheet.

The driving element drives the light emitting unit 203 to radiate backlight. The backlight radiated by the light emitting unit 203 enters the neighboring light guide plate 204, and the neighboring light guide plate 204 uniformly transmits the entered backlight on a panel surface of the LCD panel.

The larger surface of the light emitting unit 203 is disposed on the PCB 202 as shown in FIG. 2. Disposing the larger surface of the light emitting unit 203 on the PCB 202 may allow the light emitting unit 203 to be vertical more easily than disposing the smaller surface of the light emitting unit 203 on the PCB 202. If the smaller surface of the light emitting unit 203 is disposed on the PCB 202, it is difficult for the light emitting unit 203 to remain vertical, and a large amount of heat is applied to the light guide plate 204 causing the shape of the light guide plate 204 to be deformed. Therefore, disposing the larger surface of the light emitting unit 203 on the PCB 202 broadens the contacting surface between the light emitting unit 203 and the PCB 202, thereby causing the light emitting unit 203 to give off the heat and causing the light guide plate 204 to be less affected by the heat.

Figure 3:
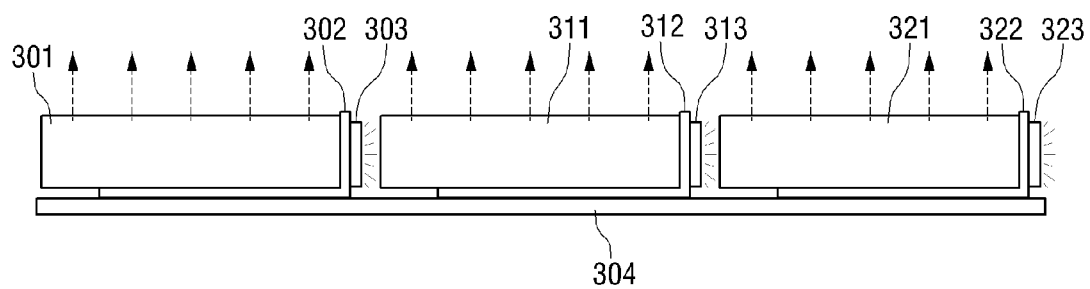
FIG. 3 is a schematic view illustrating a backlight unit according to an exemplary embodiment.

Hereinbelow, the structure of a backlight unit 103 according to an exemplary embodiment will be explained in more detail with reference to FIGS. 3 and 4. FIG. 3 is a schematic view illustrating a backlight unit 103 according to an exemplary embodiment.

Referring to FIG. 3, the backlight unit 103 includes a plurality of light guide plates 301, 311, 321, a plurality of PCBs 302, 312, 322, a plurality of light emitting units 303, 313, 323, and a bottom chassis 304.

As described above, the plurality of light guide plates 301, 311, 321 uniformly transmit backlight radiated from the plurality of light emitting units 303, 313, 323, respectively, on the panel surface of the LCD panel 104. The plurality of light guide plates 301, 311, 312 are disposed on the bottom chassis 304 at a predetermined interval. The bottom chassis 304 is a component which is finally assembled with the backlight unit 103 to absorb impact of the backlight unit 103 and to protect the backlight unit 103. Usually, a light emitting unit and a light guide plate are disposed on the bottom chassis 304.

The plurality of PCBs 302, 312, 322 are bent and disposed on at least two surfaces of the plurality of light guide plates 301, 311, 321, respectively. For example, the two surfaces on which the PCB 302 is disposed may be the bottom surface of the light guide plate 301 and one of side surfaces adjacent to the neighboring light guide plate 311. Herein, one of the side surfaces adjacent to the neighboring light guide plate 311 is in the same direction for each light guide plate 301, 311, 321. For example, if the PCB 302 is disposed beside a right portion of the light guide plate 301, other light guide plates 311, 321 have PCBs 312, 322 on their right portions, respectively, as shown in FIG. 3.

As described above, the plurality of PCBs 302, 312, 322 are bent and disposed on the bottom surfaces of the light guide plates 301, 311, 321 and one of side surfaces adjacent to the neighboring light guide plates 301, 311, 321, respectively. The plurality of PCBs 302, 312, 322 may be made of a flexible PCB to be bent or to be thin.

If the plurality of PCBs 302, 312, 322 are disposed on the plurality of light guide plates 301, 311, 321 in such a manner that the contacting surface between each of the plurality of PCBs 302, 312, 322 and each bottom surface of the plurality of light guide plates 301, 311, 321 is large, a heat radiating surface is broadened, and the light guide plates 301, 311, 321 are easily fixed on the bottom chassis 304. In more detail, if each of the plurality of PCBs 302, 312, 322 is disposed to widely contact each bottom surface of the plurality of light guide plates 301, 311, 321, respectively, the light guide plates 301, 311, 321, the PCBs 302, 312, 322, and the bottom chassis 304 may be fixed with one another through a fixing unit. Accordingly, broadening a contacting surface between each of the plurality of PCBs 302, 312, 322 and each bottom surface of the plurality of light guide plates 301, 311, 321, respectively, enables a heat radiating effect to be improved and the backlight unit 103 to be assembled easily.

Each of the plurality of PCBs 302, 312, 322 includes a reflection surface to prevent backlight from leaking out from each of the plurality of light guide plates 301, 311, 321, respectively. Specifically, the plurality of PCBs 302, 312, 322 have a reflection surface on the surface contacting the plurality of light guide plates 301, 311, 321, respectively. Each of the light guide plates 301, 311, 321 may include an additional reflection sheet to prevent backlight from leaking out. However, if a surface of each of the PCBs 302, 312, 322 is configured as a reflection surface without having the additional reflection sheet, the backlight leaking out from the light guide plates 301, 311, 321 may be reflected by the reflection surface of the PCBs 302, 312, 322. Therefore, the reflection surface of each of the PCBs 302, 312, 322 improves luminance of the backlight despite not having the additional reflection sheet of each of the PCBs 302, 312, 322.

The driving element drives the plurality of light emitting units 303, 313, 323 to radiate backlight. The backlight radiated by the plurality of light emitting units 303, 313, 323 enters the neighboring light guide plate, and the neighboring light guide plate uniformly transmits the entered backlight on a panel surface of the LCD panel.

The larger surfaces of the light emitting units 303, 313, 323 are disposed on the PCBs 302, 312, 322, respectively, as shown in FIG. 3. Disposing the larger surface of each of the light emitting units 303, 313, 323 on each of the PCBs 302, 312, 322 may allow the light emitting units 303, 313, 323 to be vertical more easily than disposing the smaller surface of each of the light emitting units 303, 313, 323 on each of the PCBs 302, 313, 322. If the smaller surface of each of the light emitting units 303, 313, 323 is disposed on each of the PCBs 302, 312, 322, it is difficult for the light emitting units 303, 313, 323 to remain vertical, and a large amount of heat is applied to the light guide plates 301, 311, 321 causing the shape of the light guide plates 301, 311, 321 to be deformed. Therefore, disposing the larger surface on the PCBs 302, 312, 322 broadens the contacting surface between the light emitting units 303, 313, 323 and the PCBs 302, 312, 322, thereby causing the light emitting units 303, 313, 323 to give off the heat more and causing the light guide plates 301, 311, 321 to be less affected by the heat.

Figure 4:
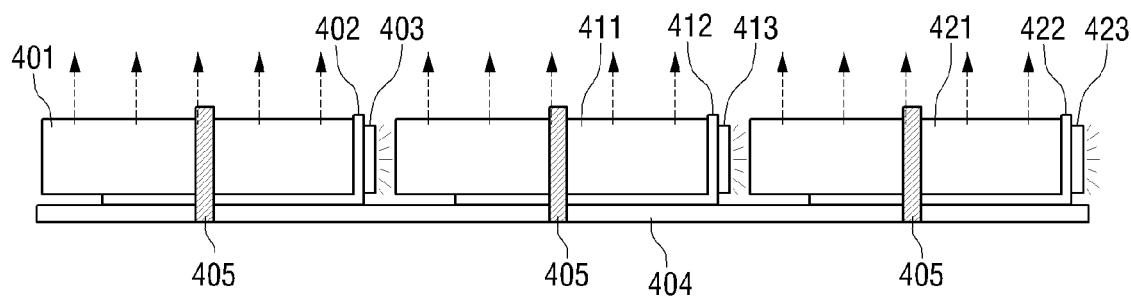
FIG. 4 is a view illustrating a backlight unit having a fixing pin according to an exemplary embodiment.

FIG. 4 is a view illustrating a backlight unit 103 having a fixing pin according to an exemplary embodiment. Referring to FIG. 4, the backlight unit 103 includes a plurality of light guide plates 401, 411, 421, a plurality of PCBs 402, 412, 422, a plurality of light emitting units 403, 413, 423, a bottom chassis 404, and a fixing pin 405.

The light guide plates 401, 411, 421, the plurality of PCBs 402, 412, 422, the plurality of light emitting units 403, 413, 423, and the bottom chassis 404 are substantially similar to those of FIG. 3 and, therefore, descriptions thereof are omitted herein.

The fixing pin 405 connects each of the plurality of light guide plates 401, 411, 421, and each of the plurality of PCBs 402, 412, 422 to the bottom chassis 404. In more detail, a hole is formed on each of the plurality of light emitting units 403, 413, 423. The fixing pin 405 connects the plurality of light guide plates 401, 411, 421 and the plurality of PCBs 402, 412, 422 to the bottom chassis 404 through the hole.

The conventional method for fixing a light emitting unit by pressing a light guide plate is disadvantageous in that the light guide plate is curved or is not fixed firmly. However, the present exemplary method for connecting the light guide plate 401 and the PCB 402 to the bottom chassis 404 using the fixing pin 405 is advantageous in that the light guide plate 401 is fixed more firmly.

The display apparatus according to the exemplary embodiments is provided as an LCD apparatus, but this is merely exemplary. Any display apparatus which requires backlight other than the LCD may be applied according to the technical aspects of the exemplary embodiments.

The PCB according to the exemplary embodiments is provided as a flexible PCB, but this is merely exemplary. Any PCB, instead of the flexible PCB, which is bent to be disposed on two surfaces of a light guide plate may be applied according to the technical aspects of the exemplary embodiments.

The fixing unit according to an exemplary embodiment is provided as the fixing pin 405, but this is also merely exemplary. Any fixing unit, instead of the fixing pin 405, which connects a light guide plate and a PCB to a bottom chassis may be applied according to the technical aspects of the exemplary embodiments.

In addition, the technical aspects of the exemplary embodiments may be applied when implementing only the backlight unit in addition to implementing a display apparatus having the backlight unit.

As described above, according to the exemplary embodiments, if a PCB is bent and disposed on two surfaces of a light guide plate, a related art light emitting element can be used, a heat radiating effect is enhanced, and a backlight unit is assembled more easily.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
a display panel on which an image is displayed; and
a backlight unit which provides backlight to the display panel,
wherein the backlight unit comprises:
a plurality of light guide plates which distribute the backlight to the display panel;
a substrate disposed on at least two surfaces of a first light guide plate of the plurality of light guide plates; and
a light emitting unit which emits the backlight, disposed between the first light guide plate and a second light guide plate, of the plurality of light guide plates, adjacent to the first light guide plate, and disposed on a surface of the substrate.

2. The display apparatus as claimed in claim 1, wherein the substrate is disposed on a bottom surface and a side surface of the first light guide plate.

3. The display apparatus as claimed in claim 2, wherein the side surface of the first light guide plate is a surface adjacent to the second light guide plate.

4. The display apparatus as claimed in claim 1, wherein the substrate is bent vertically to contact two surfaces of the first light guide plate.

5. The display apparatus as claimed in claim 1, wherein the substrate comprises a reflection surface which reflects light leaking out from the first light guide plate.

6. The display apparatus as claimed in claim 1, wherein the substrate is a flexible circuit board.

7. The display apparatus as claimed in claim 1, wherein the backlight unit further comprises:
a bottom chassis; and
a fixing unit which fixes the first light guide plate and the substrate to the bottom chassis.

8. The display apparatus as claimed in claim 2, wherein a heat radiating effect of the light emitting unit is proportional to a contacting surface between the bottom surface of the first light guide plate and the substrate.

9. The display apparatus as claimed in claim 1, wherein the backlight unit is configured as a partitioned light guide plate.

10. A backlight unit for a display panel, the backlight unit comprising:
a plurality of light guide plates which distribute backlight to the display panel;
a substrate disposed on at least two surfaces of a first light guide plate of the plurality of light guide plates; and
a light emitting unit which emits the backlight, disposed between the first light guide plate and a second light guide plate, of the plurality of light guide plates, adjacent to the first light guide plate, and disposed on a surface of the substrate.

11. The backlight unit as claimed in claim 10, wherein the substrate is disposed on a bottom surface and a side surface of the first light guide plate.

12. The backlight unit as claimed in claim 11, wherein the side surface of the first light guide plate is a surface adjacent to the second light guide plate.

13. The backlight unit as claimed in claim 10, wherein the substrate is bent vertically to contact two surfaces of the first light guide plate.

14. The backlight unit as claimed in claim 10, wherein the substrate comprises a reflection surface which reflects light leaking out from the first light guide plate.

15. The backlight unit as claimed in claim 10, wherein the substrate is a flexible circuit board.

16. The backlight unit as claimed in claim 10, further comprising:
a bottom chassis; and
a fixing unit which fixes the first light guide plate and the substrate to the bottom chassis.

17. The backlight unit as claimed in claim 16, wherein the fixing unit is a fixing pin which connects the first light guide plate and the substrate to the bottom chassis through holes respectively formed through the first light guide plate and the substrate.

18. The backlight unit as claimed in claim 11, wherein a heat radiating effect of the light emitting unit is proportional to a contacting surface between the bottom surface of the first light guide plate and the substrate.

19. The backlight unit as claimed in claim 10, wherein the backlight unit is configured as a partitioned light guide plate.

20. A backlight unit for a display panel, the backlight unit comprising:
a first light guide plate and a second light guide plate, adjacent to the first light guide plate, which distribute backlight to the display panel; and a substrate disposed on at least two surfaces of the first light guide plate and comprising a surface for mounting a light emitting unit to emit light to the second light guide plate.

21. The backlight unit as claimed in claim 20, wherein the substrate is disposed on an area of a bottom surface of the first light guide plate and a side surface, closest to the second light guide plate, of the first light guide plate.

22. The backlight unit as claimed in claim 21, wherein the substrate is disposed on at least half of the bottom surface of the first light guide plate.

* * * * *